United States Patent [19]

Tsuzuki et al.

[11] 4,238,832

[45] Dec. 9, 1980

[54] TIME DATA PROCESSING APPARATUS

[75] Inventors: Hanzou Tsuzuki, Higashiyamato; Mamoru Mizuno, Yamanashi, both of Japan

[73] Assignee: Casio Computer Co., Ltd., Tokyo, Japan

[21] Appl. No.: 12,106

[22] Filed: Feb. 14, 1979

[30] Foreign Application Priority Data

Feb. 17, 1978 [JP] Japan .................................. 53-17334

Feb. 20, 1978 [JP] Japan .................................. 53-18390

[51] Int. Cl.[3] ........................ G06F 7/48; G06F 15/02; G04B 19/30

[52] U.S. Cl. .................................................. 364/705

[58] Field of Search ......................................... 364/705

[56] References Cited

U.S. PATENT DOCUMENTS

| | | | |
|---|---|---|---|
| 3,813,533 | 5/1974 | Cone et al. | 364/705 |
| 3,816,730 | 6/1974 | Yamamoto et al. | 364/705 |
| 4,035,627 | 7/1977 | Dickinson et al. | 364/705 X |
| 4,093,992 | 6/1978 | Kawamura et al. | 364/705 |

*Primary Examiner*—Jerry Smith

*Attorney, Agent, or Firm*—Frishauf, Holtz, Goodman & Woodward

[57] ABSTRACT

A time data processing apparatus comprises a time-keeping memory for storing time data, a time-keeping circuit for renewing the time data read out from the time-keeping memory and writing the renewed time data into the time-keeping memory, repeatedly at predetermined regular intervals, and a central processing unit being accessible to the time data in the time-keeping memory while the time-keeping circuit does not make the time-keeping memory accessed.

9 Claims, 10 Drawing Figures

301

| RA \ CA | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | | | | | YEAR | | MONTH | | DAY | | HOUR | | MINUTE | | SECOND | |
| 1 | | | TR3(H) | | TR3(M) | | TR2(H) | | TR2(M) | | TR1(H) | | TR1(M) | | | TRF |
| 2 | | | RE3(H) | | RE3(M) | | RE2(H) | | RE2(M) | | RE1(H) | | RE1(M) | | | REF |
| 3 | | | AL3(H) | | AL3(M) | | AL2(H) | | AL2(M) | | AL1(H) | | AL1(M) | | | ALF |

TIME DATA PROCESSING APPARATUS

BACKGROUND OF THE INVENTION

This invention relates to a time data processing apparatus having a time-keeping circuit.

A calculator having a time-keeping circuit, such as an electronic calculator with an electronic clock, has been put to practical use. The time-keeping circuit and CPU (central processing unit) of such a known calculator operate independently of each other. It is therefore very difficult to write time data into the CPU from the time-keeping circuit while the CPU is carrying out various arithmetic operations using such time data. Thus, the known calculator is operated in the time-keeping mode at one time and in the calculation mode at another time. The time-keeping circuit is therefore considered to be no more than an attachment to the calculator. Further, such calculator cannot effect complicated arithmeticop- erations. For example, it cannot add up the results of various arithmetic operations carried out during different periods of time.

Another known calculator with a time-keeping circuit starts effecting an arithmetic operation at a preset time. That is, it begins to carry out an arithmetic operation when the current time coincides with the preset time. To achieve this, the CPU of such calculator is periodically accessed to the time-keeping circuit (e.g. every second), thereby to detect the coincidence between the current time and the preset time. In this case, the shorter the time during which the CPU is accessed to the time-keeping circuit, the more will be reduced the load on the CPU.

Accordingly, it is an object of this invention to provide a time data processing apparatus wherein both the time-counting by a time-keeping circuit and various arithmetic operations using time data from the time-keeping circuit can be easily accomplished.

SUMMARY OF THE INVENTION

According to this invention, a time-keeping memory for storing time data is connected between a central processing unit (hereinafter called "CPU") and a time-keeping circuit. The time-keeping circuit reads time data from the time-keeping memory, renews the data and writes the renewed data back into the memory, repeatedly at predetermined regular intervals. The CPU is accessible to the time-keeping memory unless the time-keeping circuit is accessed thereto. In other words, while the time-keeping circuit does not operate, the CPU can be accessed to the time-keeping memory, to thereby carry out various arithmetic operations using the time data.

Further, according to this invention, the time-keeping circuit periodically compares the current time with a preset time. When the current time is detected to coincide with the preset time, a flag in the time-keeping memory is set. Thus, only by detecting the flag being set, it can be confirmed that the CPU can be accessed to the time-keeping memory. The CPU can therefore be accessed to the time-keeping memory in the shortest possible time. Even if a number of times are preset in the time-keeping memory, the load on the CPU can be extremely reduced since the coincidence between the current time and any one of these preset times is detected by the time-keeping circuit alone.

DETAILED DESCRIPTION

Figure 1A:
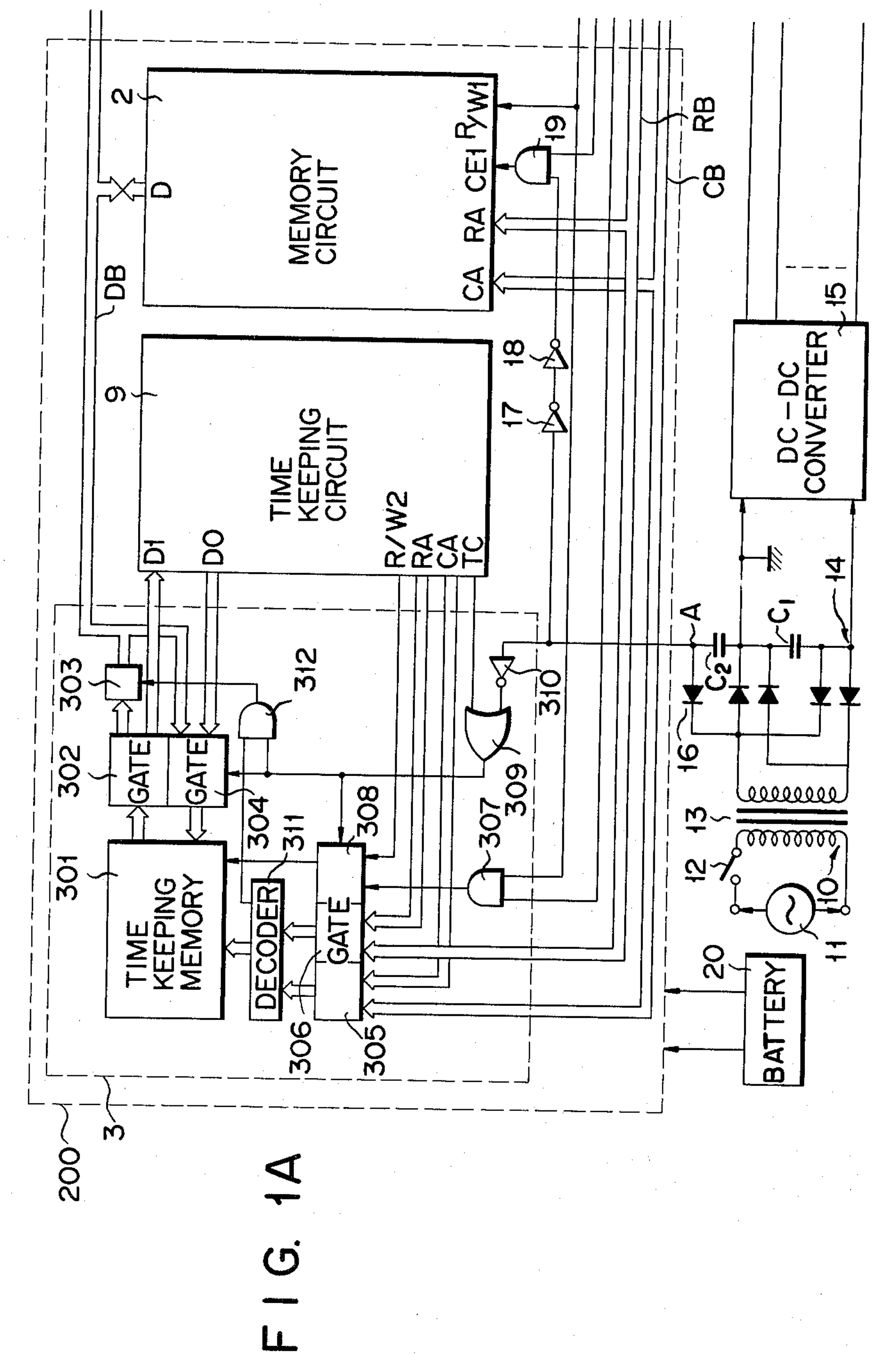
FIGS. 1A and 1B show a block circuit diagram showing an embodiment of this invention.

Now referring to the accompanying drawings, an electronic cash register embodying this invention will be described. As shown in FIG. 1, the electronic cash register comprises a CPU (central processing unit) 1, a memory circuit 2 and a time-keeping memory circuit 3. The CPU 1 is connected to the memory circuit 2 and the time-keeping memory circuit 3 by means of a data bus DB, a row address bus RB and a column address bus CB. The CPU 1 supplies chip-enabling signals CE1 and CE2 to the memory circuit 2 and the time-keeping memory circuit 3, respectively, thereby to designate one chip of the memory circuit 2 and one chip of the time-keeping memory circuit 3. At the same time, the CPU 1 supplies a read-write signal $R/W_1$ to both the memory circuit 2 and the time-keeping memory circuit 3 so that data can be read out from, or written into, the designated chips thereof.

To the CPU 1 an I/O port 4 is connected via the data bus DB and the address bus DB. The I/O port 4 receives an operation signal J from the CPU 1. Connected to the I/O port 4 are a printing section 5, a display section 6, a key input section 7 and an alarming loudspeaker 8. The printing section 5 is constituted by, for example, a line printer and supplies the I/O port 4 with signals representing the printing positions of a printing drum (not shown). The printing position signals are compared with the data stored in a buffer 21 of the I/O port 4. If they coincide with the data in the buffer 21, hammer-driving signals HD are generated to drive the hammer of the printing section 5, thereby printing the data on receipt paper or journal paper. The display section 6 displays data in accordance with digital signals DG from the I/O port 4 and segment signals SG which have been obtained by decoding data stored in a buffer 22 of the I/O port 4. The key input section 7 supplies to a buffer 23 of the I/O port 4 key input signals KI in response to timing signal KP from the I/O port 4, by operating the keys (not shown). The loudspeaker 8 is driven by an alarm signal AL supplied from the I/O port 4.

To the CPU 1 a collector 24 is connected via the data bus DB. The collector 24 is connected to receive control signals L from the CPU 1.

The time-keeping memory circuit 3 includes a time-keeping memory 301. Data in the time-keeping memory 301 are supplied to a time keeping circuit 9 via a gate circuit 302 and coupled also to an OR gate group 303 for issueing a code which indicates that the time-keeping circuit 9 is counting time. Data on the data bus DB or in the time-keeping circuit 9 are supplied to the time-keeping memory 301 through a gate circuit 304.

A column address CA from the CPU 1 and a column address CA from the time-keeping circuit 9 are supplied to a gate circuit 305. A row address RA from the CPU 1 and a row address RA from the time-keeping circuit 9 are supplied to a gate circuit 306. The outputs of the gate circuits 305 and 306 are supplied to the time-keeping memory 301 via a decoder 311. A specified address of the decoder 311 is supplied to an AND circuit 312. A read-write signal $R/W_1$ and a chip-enabling signal CE2 from the CPU 1 are supplied to a gate circuit 308 through an AND circuit 307. The gate circuit 308 is connected to receive a read-write signal $R/W_2$ from the time-keeping circuit 9.

The time-keeping circuit 9 counts time, second by second. It produces a time-counting signal TC which lasts for 15.625 msec. The signal TC is supplied to the gate circuits 302, 304, 305, 306 and 308 through an OR circuit 309. So long as the signal TC lasts, the row address RA, column address CA, signal $R/W_1$ and signal CE2 from the CPU 1 and the data bus DB are disconnected from the time-keeping memory 301, and time-keeping memory 301 is coupled to the time-keeping circuit 9. The signal TC is supplied also to an AND circuit 312. The output of the AND circuit 312 is supplied to the OR gate group 303. The OR gate group 303 produces a 4-bit code "1111" when the output of the AND circuit 312 has a level "1". The code "1111", which shows that the time-keeping circuit 9 is counting time, is transferred through the data bus DB.

Figures 2, 3:
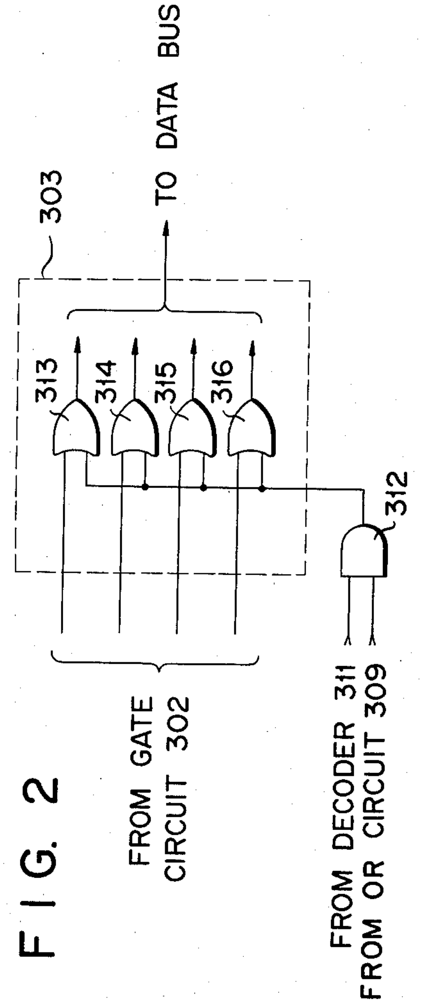
FIG. 2 is a block circuit diagram showing an OR gate group, which is used in the embodiment of FIGS. 1A and 1B.
FIG. 3 shows the memory location of a RAM provided in a time-keeping memory of the embodiment shown in FIGS. 1A and 1B.

As illustrated in FIG. 2, the OR gate group 303 comprises OR circuits 313, 314, 315 and 316, which receive four bits which constitute the data from the gate circuit 302, respectively. The output of the AND circuit 312 is supplied to the OR circuits 313, 314, 315 and 316. The outputs of the OR circuits 313 to 316 are transferred via the data bus DB as a parallel 4-bit data.

In order to confirm whether the time-keeping circuit 9 is counting time, the CPU 1 supplies a specific address to one input terminal of the AND circuit 312, thereby to make the AND circuit 312 conductive. To the other input terminal of the AND circuit 312 the signal TC is supplied from the time-keeping circuit 9 via the OR circuit 309. If a signal TC having level "1" is supplied to the AND circuit 312 while the specific address is supplied thereto from the CPU 1, the AND circuit 312 produces an output having level "1", whereby the OR gate group 303 produces a code "1111". This code "1111" is written into the CPU 1 via the data bus DB. Whenever it receives the code "1111", the CPU 1 is not accessed to the time-keeping memory 301.

As shown in FIG. 1, a power source section 10 comprises an AC power source 11. The power source 11 supplies power to a power transformer 13 via a power switch 12. The secondary winding voltage of the transformer 13 is rectified by a full-wave rectifier circuit 14 and is filtered by a filtering capacitor $C_1$. The output of the capacitor $C_1$, which is connected to ground at the positive potential side, is supplied to a DC-DC converter 15. The DC-DC converter 15 varies the input voltage, and its output is supplied to the CPU 1, I/O port 4, printing section 5, display section 6, key input section 7, loudspeaker 8 and collector 24. Between the ground and one end of the secondary winding of the transformer 13 there is connected a series circuit constituted by a diode 16 and a capacitor $C_2$. The capacitor $C_2$ has a much smaller capacitance than the capacitor $C_1$. The voltage built up at the connecting point of the diode 16 and capacitor $C_2$ is applied to the OR circuit 309 via an inverter 310 and also to one input terminal of an AND circuit 19 via inverters 17 and 18. The other input terminal of the AND circuit 19 is supplied with the signal CE1 from the CPU 1. The output of the AND circuit 19 is supplied as chip-enabling signal CE1 to the memory circuit 2. Further provided is a battery 20 for supplying power to the memory circuit 2, time-keeping memory circuit 3 and time-keeping circuit 9 in case the power source section 10 is turned off or the power supply is cut by accident.

The time-keeping memory 301 is constituted by a RAM, which has such a memory location as illustrated in FIG. 3. As shown in FIG. 3, the RAM consists of four rows 0–3 and sixteen columns 0–15. In columns 11 to 0 of row 0 time data, i.e. year, month, day, hour, minute and second which show the current date and time. Three kinds of collect time data TR3, TR2 and TR1 representing the time which data are to be collected are written in columns 13 to 2 of row 1, and a collect flag TRF is written in column 0 of row 1. Written in columns 13 to 2 of row 2 are three kinds of read operation time data RE3, RE2 and RE1 representing the time during which data are to be read out, and in column 0 of row 2 a read flag REF is written. Three kinds of alarm time data AL3, AL2 and AL1, which represent the time during which an alarm is to be given, are written in columns 13 to 2 of row 3, and an alarm flag ALF is written in column 0 of row 3. The column 0 of any row consists of three bits. Collect flag TRF shows whether any collect time data TR1, TR2 or TR3 coincides with the current time. When any one of the collect time data coincides with the current time, a "1" signal is set at the corresponding bit of the column 0. Similarly, read flag REF and alarm flag ALF indicate whether any read time data RE1 RE2 or RE3 coincides with the current time and whether any alarm time data AL1, AL2 or AL3 coincides with the current time. When any read time data coincides with the current time, a "1" signal is set at the corresponding bit of column 0 of row 2, and when any alarm time data coincides with the current time, a "1" signal is set at the corresponding bit of column 0 of row 3.

Figure 4:
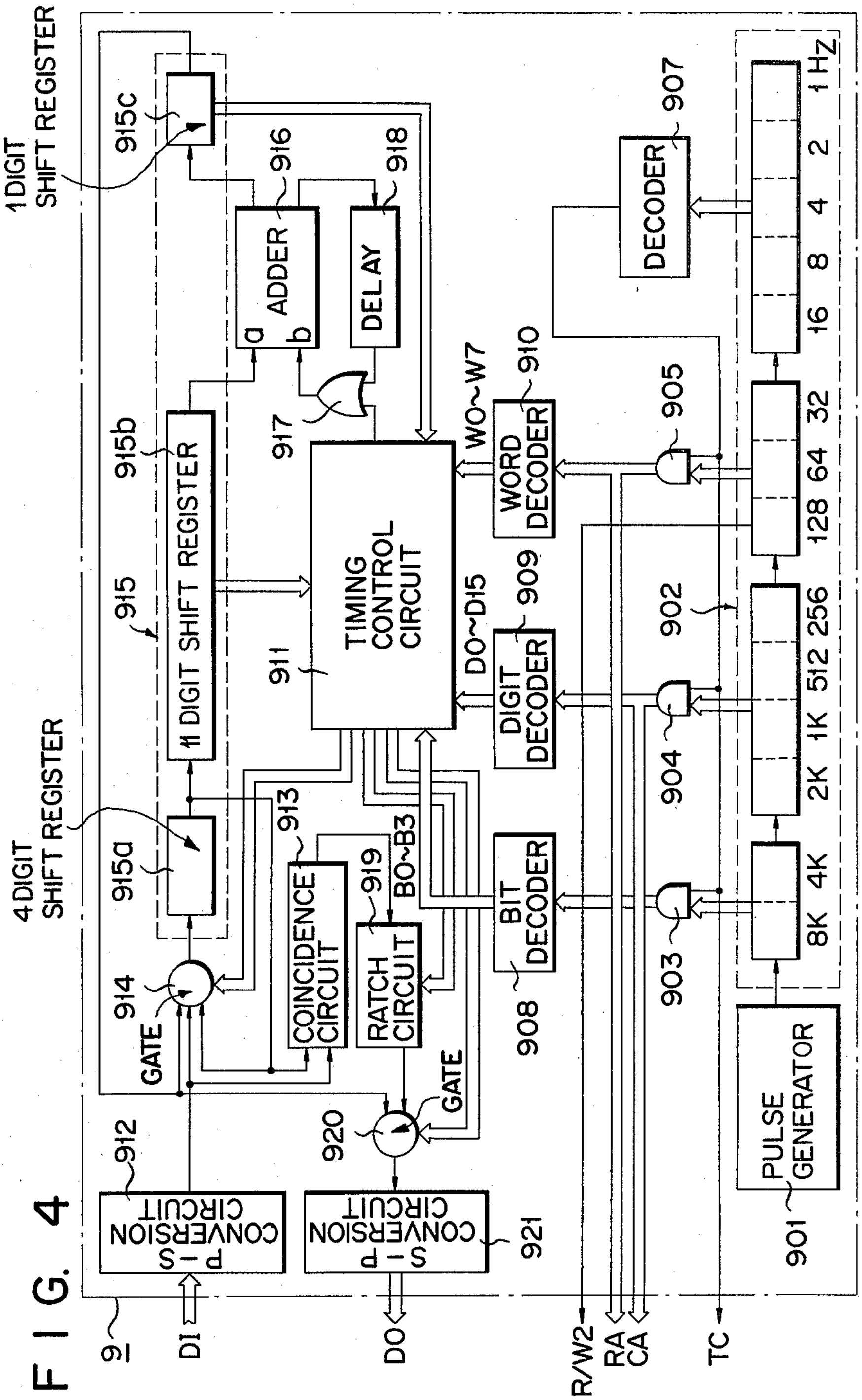
FIG. 4 is a block circuit diagram showing the time-keeping circuit of the embodiment illustrated in FIGS. 1A and 1B.

As illustrated in FIG. 4, the time-keeping circuit 9 comprises a pulse generator 901 for generating reference pulse signals of, for example, 16 KHz. The reference pulse are supplied to a frequency division counter 902. The frequency division counter 902 is constituted by, for example, 14 bits and divides the frequency of the reference pulse signals to produce signals of various frequencies, ranging 8 KHz to 1 Hz. Bit output signals of 8 KHz and 4 KHz of the counter 902 are supplied to an AND circuit 903, and bit output signals of 2 KHz to 256 Hz to an AND circuit 904, bit output signals of 128 Hz to 32 Hz to an AND circuit 905, and bit output signals of 16 Hz to 1 Hz to a zero-detecting circuit 907.

The zero-detecting circuit 907 produces a "1" signal whenever it detects the frequency division counter 902 stops producing bit output signals of 32 Hz to 1 Hz. The output signal of the zero-detecting circuit 907 is supplied as a gate control signal to the AND circuits 903 to 905 and also as a time-counting signal TC to the time-keeping memory 301 of the time-keeping memory circuit 3.

The output of the AND circuit 903 is supplied to a bit decoder 908, the output of the AND circuit 904 to a digit decoder 909, and the output of the AND circuit 905 to a word decoder 910. The outputs $B_0$–$B_3$ of the bit decoder 908, outputs $D_0$–$D_{15}$ of the digit decoder 909 and outputs $W_0$–$W_7$ of the word decoder 910 are supplied to a timing control circuit 911. In the meantime, the output of the AND circuit 904 is supplied as a column address CA to the time-keeping memory circuit 3. Also to the time-keeping memory circuit 3 the output of the AND circuit 905 and the 128 Hz bit output of the frequency division counter 902 are supplied as a row address RA and a read-write signal $R/W_2$, respectively. So long as the zero-detecting circuit 907 produces a time-counting signal TC "1", data read out from the time-keeping memory 301 are transferred via the gate circuit 302 to a conversion circuit 912 for converting parallel data into serial data.

The output of the conversion circuit 912 is supplied to a coincidence circuit 913. At the same time it is supplied to 4-digit shift register 915*a* through a gate circuit 914 which is controlled by the output of the timing control circuit 911. The output of the shift register 915*a* is supplied to the coincidence circuit 913 and to a 11-digit shift register 915*b*. All the bit outputs but the last bit output of the shift register 915*b* are supplied to the timing control circuit 911, and the last bit output thereof is supplied to an input terminal a of a half adder 916. The other input terminal b of the half adder 916 is connected to receive a "+1" signal from the timing control circuit 911 via an OR circuit 917. The carry output of the adder 916 is added to the input terminal a through a 1-bit delay circuit 918 and the OR circuit 917. The addition output of the half adder 916 is supplied to a 1-digit (or 4-bit) shift register 915*c*. All the bit outputs of the shift register 915*c*, but the last bit output, are supplied to the timing control circuit 911, and the last bit output thereof is supplied back to the shift register 915*a* via the gate circuit 914.

The shift registers 915*a*, 915*b* and 915*c* constitute a time-keeping register 915. The time-keeping register 915 is shifted under control of timing pulses from the bit decoder 908.

The output of the coincidence circuit 913 is supplied to a latch circuit 919 for storing a coincidence signal. The latch circuit 919 operates at a timing which is controlled by a signal from the timing control circuit 911. That is, the latch circuit 919 stores data showing whether the collect time data, read operation time data or alarm time data in the time-keeping memory 301 coincide with the current time. The output of the latch circuit 919 is transferred to a conversion circuit 921 via a gate circuit 920 which is controlled by the timing control circuit 911. The conversion circuit 921 is designed to convert serial data into parallel data. The conversion circuit 921 is connected to receive the output of the shift register 915*c* via the gate circuit 920. That is, the conversion circuit 921 converts the serial data, i.e. output of the shift register 915*c* into parallel data. The parallel data is transferred to the time-keeping memory 301 via the gate circuit 304, whereby the current time, collect flag TRF, read flag REF and alarm flag ALF are written into time-keeping memory 301.

Figure 5:
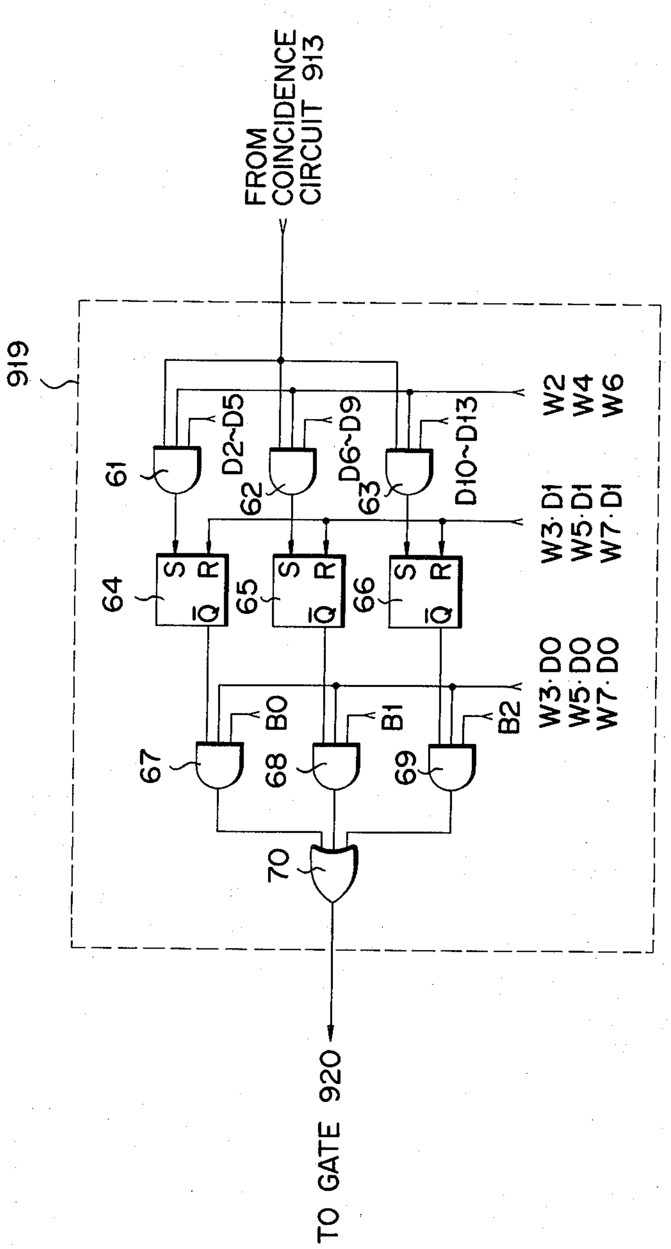
FIG. 5 is a block circuit diagram showing a latch circuit shown in FIG. 4.

The latch circuit 919 is so constructed as illustrated in FIG. 5 AND circuits 61, 62 and 63 receive the output of the coincidence circuit 913, the level of which is "0" when any time data coincides with the current time and is "1" when any time data does not coincide with the current time. Further, AND circuits 61, 62 and 63 each receive outputs $W_2$, $W_4$ and $W_6$ of the word decoder 910. The AND circuit 61 receives outputs $D_2$ to $D_5$ of the digit decoder 909, the AND circuit 62 outputs $D_6$ to $D_9$ and the AND circuit 63 outputs $D_{10}$ to $D_{13}$. The outputs of the AND circuits 61, 62 and 63 are supplied to the set input terminals S of flip-flop circuits 64, 65 and 66, respectively. The reset input terminal R of each flip-flop circuit receives output $W_3 \cdot D_1$, $W_5 \cdot D_1$, $W_7 \cdot D_1$ of the digit decoder 909 and the word decoder 910. The signal from the output terminals $\overline{Q}$ of the flip-flop circuits 64, 65 and 66 are supplied to AND circuits 67, 68 and 69, respectively. The AND circuits 67, 68 and 69 receive output $W_3 \cdot D_0$, $W_5 \cdot D_0$, $W_7 \cdot D_0$ of the digit decoder 909 and the word decoder 910. Further, the AND circuits 67, 68 and 69 receive output $B_0$, $B_1$ and $B_2$ of the bit decoder 908, respectively. The outputs of the AND circuits 67, 68 and 69 are supplied to the gate circuit 920 through an OR circuit 70.

Now it will be described how the time-keeping circuit 9 operates. All the bit outputs of the frequency division counter 902 of 16 Hz to 1 Hz come to have value "0" once in every second. Their level remains "0" for 32.25 msec, during which time the time-counting signal TC from the zero-detecting circuit 907 has value of "1" and the AND circuits 903, 904 and 905 remain conductive. During this period the time-keeping circuit operates to count time. The signal TC switches the gate circuits 302, 304, 305, 306 and 308 of the time-keeping memory circuit 3 (see FIG. 1), thereby effecting the data transfer between the time-keeping memory 301 and the time-keeping circuit 9. The output of the AND circuit 905 changes from "000" to "100", "010", "110", "001", "101", "011" and "111". These eight binary codes correspond to eight words $W_0$ to $W_7$, respectively. The words $W_0$ to $W_7$ are produced one after another in 32.25 msec.

Word $W_0$ is a combination of row address RA "00" from 64 Hz, 32 Hz bit output of the frequency division counter 910 via the AND circuit 905 and read-write signal $R/W_2$ "0", i.e. 128 Hz bit output of the frequency division counter 902. Thus, when word $W_0$ is produced by the word decoder 910, the data in the columns of row 0 are read out one after another and then supplied to the time-keeping register 915 through the conversion circuit 912 and the gate circuit 914. When a second data in a register 915 passes through the registor 915, "1" is added to the second data. Word $W_1$ is a combination of read-write signal $R/W_2$ "1" and row address RA "00". Thus, it is written into row 0 of the time-keeping memory 301 via the gate circuit 920 and the conversion circuit 921. The "hour" and "minute" data in row 0 of the time-keeping memory 301 are then written into the 4-digit shift register 915*a* via the gate circuit 914. The "hour" and "minute" data will thereafter circulate in the loop circuit constituted by the gate circuit 914 and the shift register 915*a*. Word $W_2$ is a combination of read-write signal $R/W_2$ "0" and row address RA "10". Thus, when word $W_2$ is produced by the word decoder 910, the collect time data in the columns of row 1 to the time-keeping memory 301 are read out and then supplied to one input terminal of the coincidence circuit 913 through the conversion circuit 912. The other input terminal of the coincidence circuit 913 receives the current time. The coincidence circuit 913 therefore compares the collect time data with the current time. Its output is inputted into the latch circuit 919. When word $W_3$ and digit $D_0$ are supplied to the latch circuit 919 from the word decoder 910 and the digit decoder 909, respectively, the output of the coincidence circuit 913 is read out and written as a collect flag TRF into column 0 of row 1 of the time-keeping memory 301. In a similar manner the read operation time data and alarm time data are compared with the current time to see whether they coincide with the current time. $\overline{Q}$ outputs which designate whether or not they coincide with the current time are written into a 0th column of the time-keeping memory 301 from the flip-flop circuits 64, 65, 66.

When the comparison between the time data and the current time comes to an end, the time-keeping circuit 9 stops counting time. Simultaneously, the zero-detecting circuit 907 produces a time-counting signal TC having level "0". This signal TC switches the gate circuits 302, 304, 305, 306 and 308 such that the time-keeping memory 301 can exchange data with the CPU 1.

Figure 6:
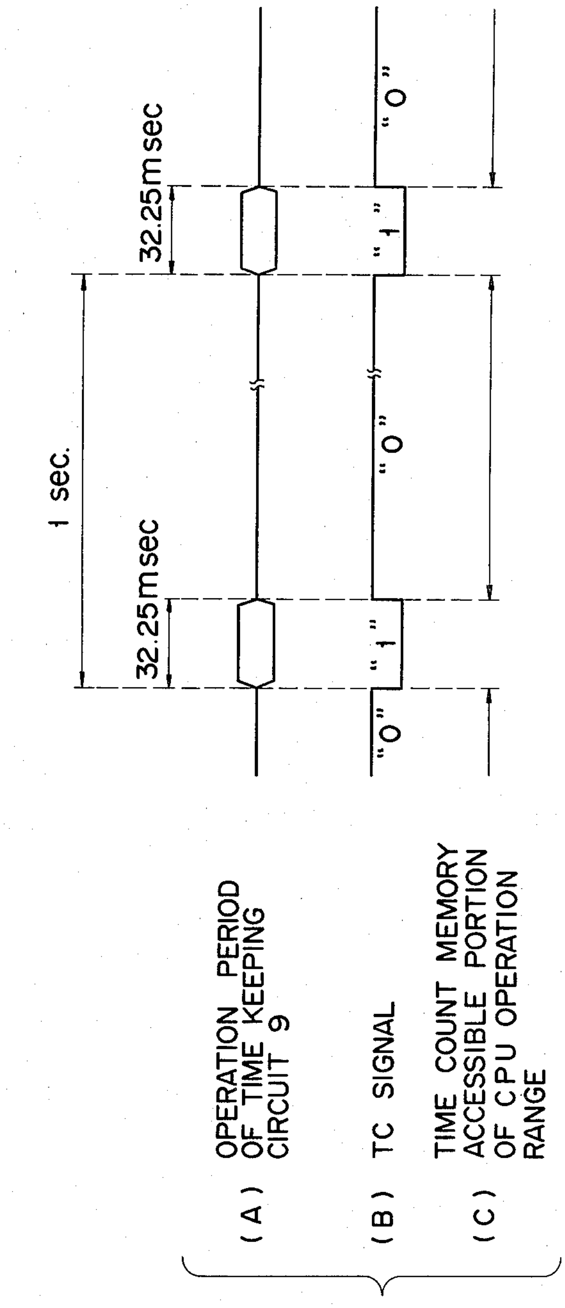
FIG. 6 (A) to FIG. 6 (C) are a time chart illustrating how the time-keeping memory shown in FIGS. 1A and 1B is operated while accessed to by a CPU.

Now referring to FIG. 6, it will be described how the CPU 1 is accessed to the time-keeping memory 301. As shown in FIG. 6(A), the time-keeping circuit 9 works every second for 32.25 msec, during which time a time-counting signal TC having level "0" lasts as illustrated in FIG. 6(B). As long as signal TC continues, or as long as the time-keeping circuit 9 uses the time-keeping memory 301, the CPU 1 cannot be accessed to the time-keeping memory 301 as shown in FIG. 6(C).

Figure 7:
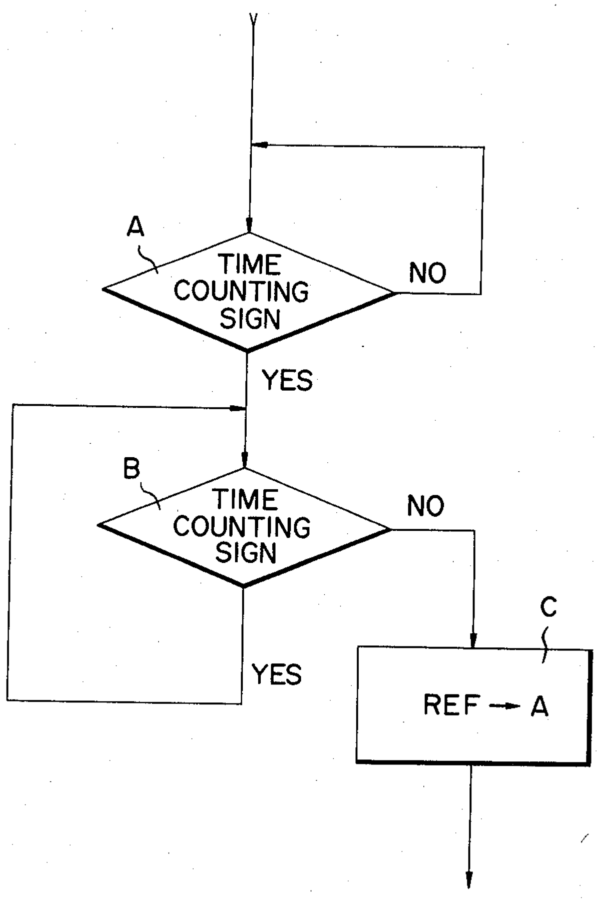
FIG. 7 is a flow chart showing how the CPU operates to transfer data to and from the time-keeping memory.

With reference to FIG. 7 it will now be explained how the CPU 1 is accessed to the time-keeping memory 301 thereby to effect data transfer between them. First, it is detected whether a time-counting signal TC exists (process A). More specifically, the CPU 1 supplies a specific address to one input terminal of the AND circuit 312 through the row address bus RB and column address bus CB. If signal TC is supplied at this time to the other input terminal of the AND circuit 312, the AND circuit 312 produces a "1" output, whereby the OR gate group 303 produces a code "1111" which indicates that the time-keeping circuit 9 is counting time. The code "1111" is transferred through the data bus DB. The CPU 1 reads the code "1111" from the data bus DB, thus detecting that a time-counting signal TC exists. If the CPU 1 detects no time-counting signal TC, process A is repeated until a time-counting signal TC is detected. If the CPU 1 detects a time-counting signal TC, it is again detected whether a time-counting signal TC exists (process B) in the same manner as in process A. When no time-counting signal TC is detected in process B, the CPU 1 is finally accessed to the time-keeping memory 301. Then, the read flag REF is read out from the time-keeping memory 301 into a register A (not shown) provided in the CPU 1. In this way, the data transfer between the CPU 1 and the time-keeping memory 301 is started when the CPU 1 detects that a time-counting signal TC does not exist any more.

Figure 1B:
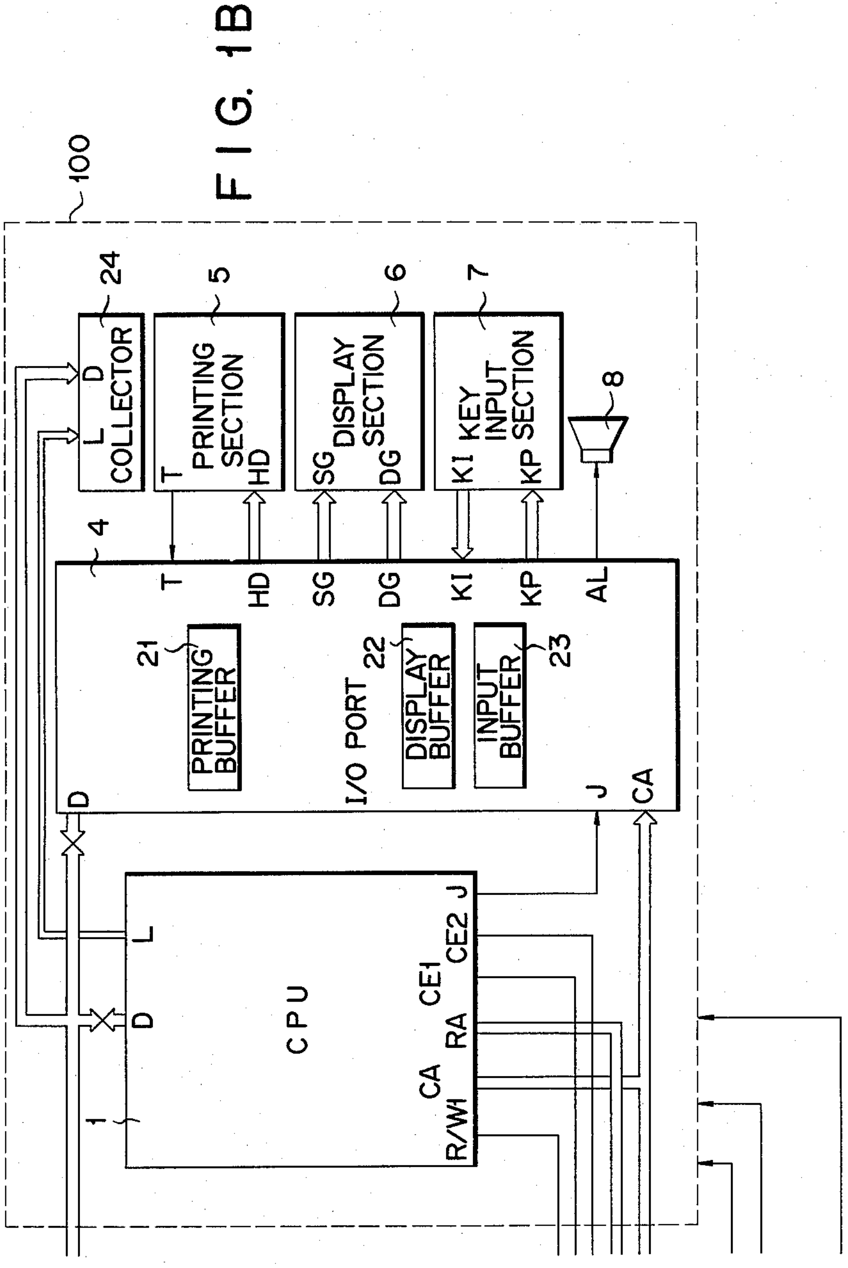
Figure 8:
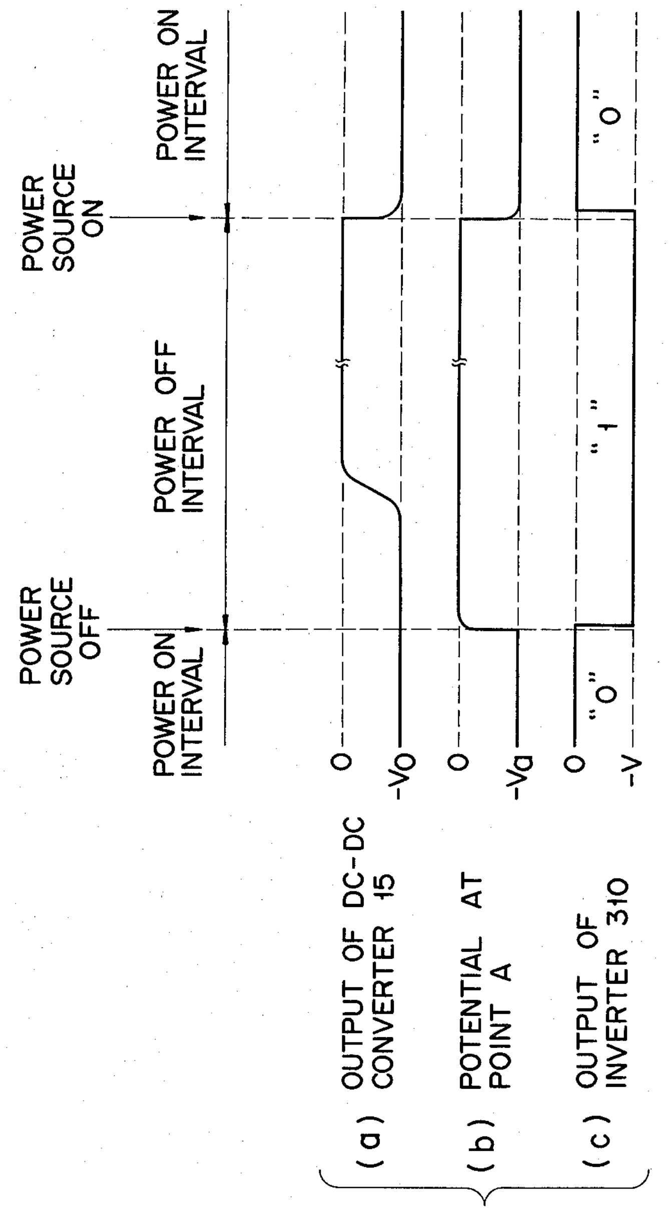
FIG. 8 is a time chart showing how the apparatus shown in FIGS. 1A and 1B operates when the power supply is stopped.

Now referring to FIG. 8, it will be described how the apparatus shown in FIGS. 1A and 1B operates in case the power supply is stopped by accident. As illustrated in FIG. 1A, while the power switch 12 is set in on-position, the commercially available power source 11 supplies AC power. The AC power is rectified by the full-wave rectifier circuit 14 and filtered by the capacitor $C_1$. The output of the capacitor $C_1$ is supplied to the DC-DC converter 15. The converter 15 varies the input voltage, and its output is supplied to the CPU 1, I/O port 4, printing section 5, display section 6, key input section 7, loudspeaker 8 and collector 24. A voltage built up by the secondary winding of the power transformer 13 is rectified by the diode 16 and then charged in the capacitor $C_2$. As a result, at point A in FIG. 1A there appears such a specific voltage $-Va$ as illustrated in FIG. 8(*b*). Voltage $-Va$ is applied to the inverters 310 and 17. The output of these inverters therefore has a level "0", and that of the inverter 18 has a level "I". For this reason, the OR circuit 309 produces no output, and the AND circuit 19 supplies chip-enabling signal CE1 to the memory circuit 2.

If the power supply is stopped by accident under these circumstances, the capacitor $C_1$ immediately discharges its charge since its capacity is chosen to be extremely small. The voltage at point A quickly reaches level "0" as shown in FIG. 8(*b*), and the output of the inverters 310 and 17 comes to have level "1". The output having level "1" of the inverter 310 is supplied to the gate circuits 302, 304, 305, 306 and 308 through the OR circuit 309, whereby all these gate circuits are so switched as to make data transfer between the CPU 1 and the time-keeping circuit 9 possible. The ouput of level "1" from the inverter 310 is also supplied to one input terminal of the AND circuit 312 via the OR circuit 309. When the other input terminal of the AND circuit 312 receives an address, the AND circuit 312 supplies an output to the OR gate group 303. Upon receipt of the output of the AND circuit 312 the OR gate group 303 produces a code "1111", whereby the CPU 1 is prohibited from being accessed to the time-keeping memory 301. In the meantime, the output of the inverter 17 is inverted by the inverter 18 to become a "0" signal. Thus, the AND circuit 19 is closed. As a result, the chip-enabling signal CE1 from the CPU 1 is not supplied to the memory circuit 2. Consequently, the CPU 1 is prohibited from being accessed to the memory circuit 2. This is how the data in the time-keeping memory 301 and the memory circuit 2 are prevented from being destroyed by an erroneous operation of the CPU 1 which may take place due to a drop of power source voltage in the event of power supply cut.

While the power supply is cut or the switch 12 is put in the off-position, the battery 20 supplies power to the memory circuit 2, time-keeping memory circuit 3 and time-keeping circuit 9 thereby to hold the data in the memory circuit 2 and time-keeping memory 301 and make the time-keeping circuit 9 count time. The filtering capacitor $C_1$ of the power source section 10 has a capacity large enough to maintain the input voltage to the DC-DC converter 15 at a prescribed value for a predetermined time after the power supply has been stopped. The output voltage of the DC-DC converter 15 is therefore maintained at a prescribed value as illustrated in FIG. 8(A). While the output voltage of the converter 15 is maintained at the prescribed value, the stored data being processed in the CPU 1 is transmitted to the memory circuit 2 to prevent damage to the data.

Figure 9:
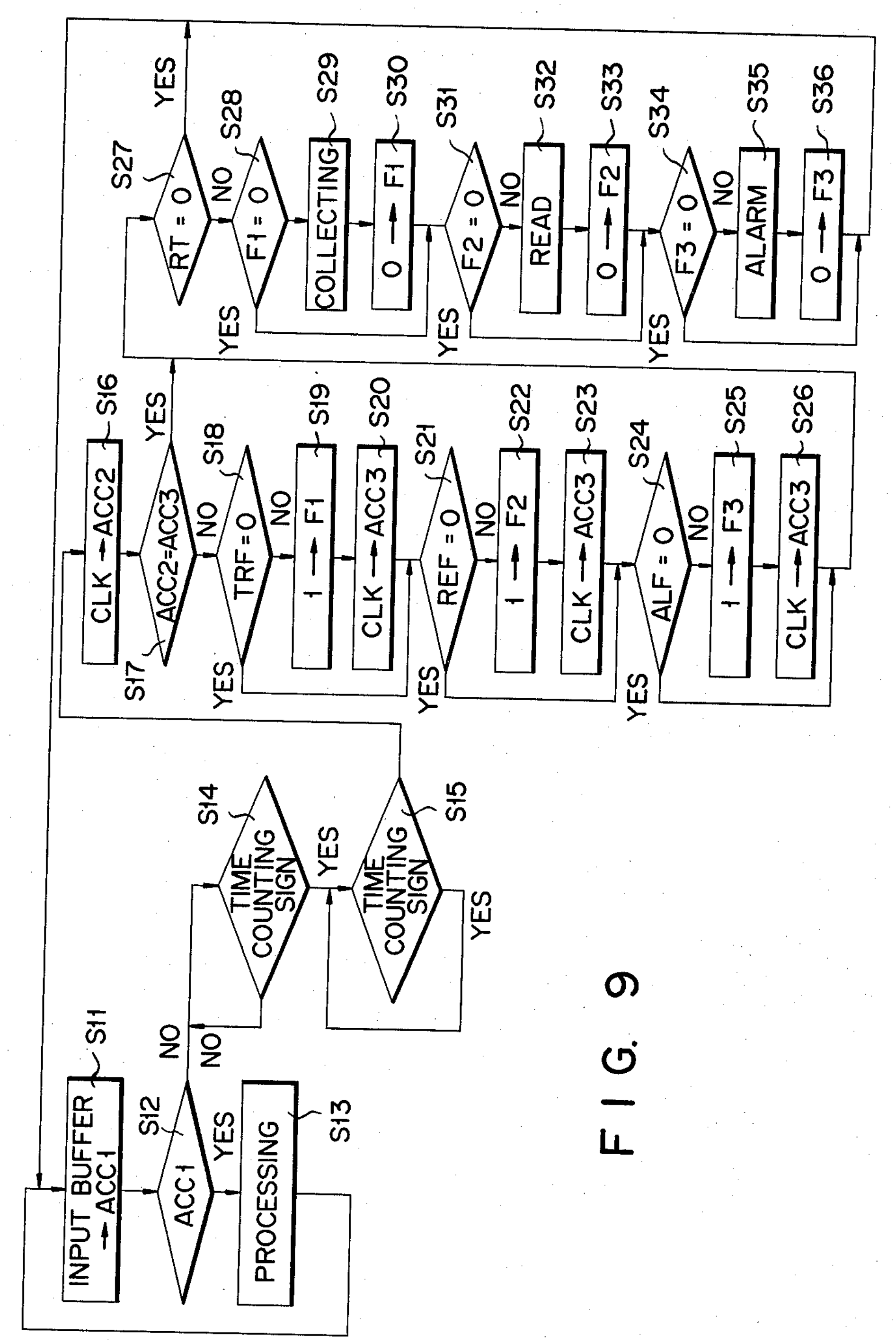
FIG. 9 is a flow chart illustrating how the various data stored in the time-keeping memory shown in FIGS. 1A and 1B are processed by the CPU.

Now referring to the flow chart of FIG. 9, it will be described how the CPU 1 processes data in various ways using a current time data CLK, a collect flag TRF, read flag REF and alarm flag ALF, all stored in the time-keeping memory 301.

First the contents of the input buffer 23 of the I/O port 4 are written into a register ACC 1 (not shown) of the CPU 1 (step 11). Then it is detected whether the register ACC 1 holds any key input data (step 12). This can be achieved by examining the contents of the buffer 23, which are key input data written into the buffer 23 by operating the keys (not shown) of the key input section 7. If key input data is found in the register ACC 1, it is processed (step 13). When step 13 is completed, step 11 is repeated to write key input data into the register ACC 1, and step 12 is then repeated. If no key input data is found in the register ACC 1 in step 12, it is detected whether a time-counting code exists (step 14). Step 14 is repeated until a time-counting code "1111" is detected. If a time-counting code is detected in step 14, step 15 is carried out. So long as the time-counting code lasts, step 15 is repeated.

When the time-counting code vanishes, the current time data CLK is read out from the time-keeping memory 301 and written into a register ACC 2 (not shown) of the CPU 1 (step 16). Then, the contents of the register ACC 2 are compared with the contents of another register ACC 3 (not shown) of the CPU 1 (step 17). At first the register ACC 3 stores a "0" signal, though it will ultimately store the current time data CLk in step 20, step 23, or step 26 to be described. Thus, the contents of the registers ACC 2 and ACC 3 are not identical, and it is detected whether the collect flag TRF in the time-keeping memory 301 is set (step 18). If the current time data CLK coincides with any one of the collect time data TR1 to TR3, the corresponding bits of the collect flag TRF are set at "1". In this case, TRF≠0, and "1" is written into a flag register F1 (not shown) of the CPU 1 (step 19). Then, the current time data CLK is read out from the time-keeping memory 301 and written into the register ACC 3 of the CPU 1 (step 20).

Upon completion of step 20 or when the collect flag TRF is detected not to be set (i.e. TRF=0) in step 18, it is detected whether the read flag REF in the time-keeping memory 301 is set (step 21). If the current time data CLK coincides with any one of the read operation time data RE1 to RE3, the corresponding bits of the read flag REF are set at level "1". In this case, REF≠0, and a "1" signal is written into a flag register F2 (not shown) of the CPU 1 (step 22). Then, the current time data CLK is read out from the time-keeping memory 301 and written into the register ACC 3 (step 23).

Upon completion of step 23 or when the read flag REF is detected not to be set (i.e. REF=0) in step 21, it is detected whether the alarm flag ALF in the time-keeping memory 301 is set (step 24). If the current time data CLK coincides with any one of the alarm time data AL1 to AL3, the corresponding bits of the alarm flag ALF are set at level "1". In this case, ALF≠0, and a "1" signal is written into a flag register F3 (not shown) of the CPU 1 (step 25). Then, the current time data CLK is read out from the time-keeping memory 301 and written into the register ACC 3 (step 26).

Upon completion of step 26, or when the alarm flag ALF is detected not to be set (i.e. ALF=0) in step 24, or when the contents of the registers ACC 2 and ACC 3 are detected to be identical in step 17, step 27 is carried out. That is, if the contents of the registers ACC 2 and ACC 3 are found identical in step 17, steps 18 to 26 are not to be carried out for the following reason. Since it is necessary to keep any flag TRF, REF or ALF in the set state for one second, any further steps for setting a flag, i.e. steps 18 to 26, must not be carried out until one second elapses after step 16 has been effected. That is, any further steps for setting a flag must not be carried out until the contents of the registers ACC 2 and ACC 3 are detected not to be identical in step 17.

Step 27 is to detect whether a receipt issue flag RT in the CPU 1 is set. The flag RT is set when a receipt is made out. That is, in step 27 it is detected whether or not a receipt has been issued. If no receipt has been issued, step 11 will be carried out again. If the receipt issue flag RT is detected to be set in step 27, it is then detected whether the flag register F1 stores a "0" signal (step 28). If the flag register F1 stores a "1" signal, i.e. F1≠0, the CPU 1 transfers collect data D to the collector 24 via the data bus DB and supplies a control signal L to the collector 24 (step 29). This done, a "0" signal is written into the flag register F1 (step 30).

Upon completion of step 30 or when the flag register F1 is found to store a "0" signal in step 28, it is detected whether the flag register F2 stores a "0" signal (step 31). If the flag register F2 is found to store a "1" signal, a read operation is carried out (step 32). When step 32 is finished, a "0" signal is written into the flag register F2 (step 33).

Upon completion of step 33 or when the flag register F2 is found to store a "0" signal in step 31, it is detected whether the flag register F3 stores a "0" signal (step 34). If the flag register F3 is found to store a "1" signal, an alarm setting code is supplied to the I/O port 4 thereby to produce an alarm signal (step 35). This done, a "0" signal is written into the flag register F3 (step 36). Upon completion of step 36 or when the flag register F3 is found to store a "0" signal in step 34, step 11 is started again. Thereafter, steps 11 to 36 are repeated to detect various preset times.

What we claim is:

1. A time data processing apparatus comprising:
- a central processing unit;
- a time-keeping memory for storing time data;
- a time-keeping circuit coupled to said time-keeping memory for reading all the time data from said time-keeping memory during a period equal to the smallest unit of time represented by the time data, and including a means for renewing the time data read out from said time-keeping memory and writing the time data thus renewed into said time-keeping memory, without being controlled by said central processing unit; and
- signal supply means coupled to said central processing unit for supplying said central processing unit with a signal which represents the period of time between the completion of operation of said time-keeping circuit and the next period equal to the smallest unit of time;
- said signal from said signal supply means enabling said central processing unit to have access to the time data in said time-keeping memory when said time-keeping circuit is stopped.

2. A time data processing apparatus according to claim 1, further comprising a first power source for supplying drive voltage to said time-keeping circuit; a second power source for supplying drive voltage to said central processing unit; detector means for detecting a voltage drop in the second power source; and means coupled to said detector for preventing said central processing unit from being accessed to said time-keeping memory when there is a voltage drop detected in the second power source.

3. A time data processing apparatus according to claim 1, wherein said time-keeping memory has a memory area for storing current time data, a memory area for storing preset time data to be compared with the current time data and a memory area for storing flag data representing coincidence or non-coincidence between the preset time data and the current time data; and said time-keeping circuit includes means for comparing the current time data and the preset time data repeatedly at regular intervals, thereby to write into said time-keeping memory a flag data showing coincidence or non-coincidence between the current time data and the preset time data.

4. A time data processing apparatus according to claim 3, wherein said memory area for storing the preset time data includes an area for storing collect time data and an area for storing a collect flag as said flag data.

5. A time data processing apparatus according to claim 4, whrein said central processing unit includes means for starting collecting of time data upon detecting that a collect flag is stored in said time-keeping memory.

6. A time data processing apparatus according to claim 3, wherein said memory area for storing the preset time data includes an area for storing read operation time data and an area for storing a read flag as said flag data.

7. A time data processing apparatus according to claim 6, wherein said central processing unit includes means for starting a reading operation upon detecting that a read flag is stored in said time-keeping memory.

8. A time data processing apparatus according to claim 3, wherein said memory area for storing the preset time data includes an area for storing alarm time data and an area for storing a alarm flag as said flag data.

9. A time data processing apparatus according to claim 9, wherein said central processing unit includes means for starting an alarming operation upon detecting that an alarm flag is stored in said time-keeping memory.

* * * * *